Figure 1:
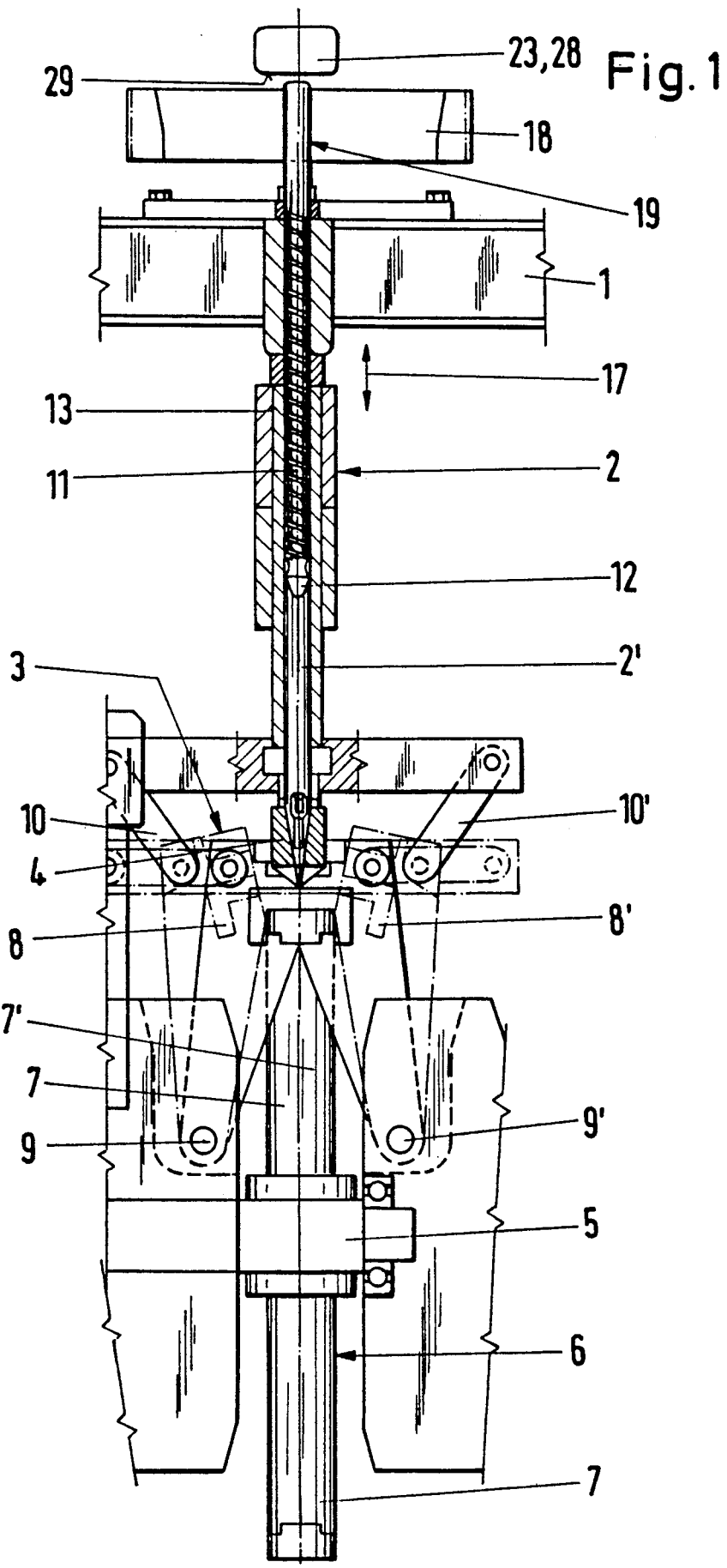

United States Patent [19]

Reil

[11] Patent Number: 5,004,411

[45] Date of Patent: Apr. 2, 1991

[54] APPARATUS FOR THE INTEGRAL MOULDING OF A SYNTHETIC PLASTICS PART

[75] Inventor: Wilheim Reil, Bensheim, Fed. Rep. of Germany

[73] Assignee: Tetra Pak Holdings & Finance S.A., Pully, Switzerland

[21] Appl. No.: 503,634

[22] Filed: Apr. 3, 1990

[30] Foreign Application Priority Data

Apr. 7, 1989 [DE] Fed. Rep. of Germany ....... 3911246

[51] Int. Cl.$^5$ .................... B29C 45/48; B29C 45/50; B29C 45/56
[52] U.S. Cl. ................................. 425/117; 425/121; 425/125; 425/129.1; 264/DIG. 41
[58] Field of Search ............ 425/116, 117, 125, 129.1, 425/121, 1; 264/DIG. 41

[56] References Cited

U.S. PATENT DOCUMENTS

| 3,020,594 | 2/1962 | Makowski | 425/129.1 |
| 4,525,318 | 6/1985 | Reil et al. | 425/121 |
| 4,834,638 | 5/1989 | Miyahara et al. | 425/116 |

FOREIGN PATENT DOCUMENTS 1092744 10/1960 Fed. Rep. of Germany .
3207701 3/1982 Fed. Rep. of Germany .

Primary Examiner—Willard Hoag
Attorney, Agent, or Firm—Biebel, French & Nauman

[57] ABSTRACT

The invention describes an apparatus for the integral injection molding of a synthetic plastic top on a paper tube with an overall injection molding unit with a nozzle, a driven extruder worm (4), plasticising cylinder and a synthetic plastics injection unit, the nozzle being connected to the plasticising cylinder and being enclosed at least partially and externally by two movable outer mold parts, the inner mold part consisting of a movable mandrel.

To reduce the technical complication while at the same time satisfying more fully the hygiene demands imposed on such machines, particularly in the foodstuffs sector, it is according to the invention suggested that the plasticising cylinder and the nozzle be stationary in their mountings on the machine frame and that the extruder worm be driven by an electric motor and that the synthetic plastics injection device comprise a two-armed lever which is driven and which is subject to the action of a control force unit and which is in contact with the extruder worm adapted for movement in the direction of its longitudinal axis.

6 Claims, 2 Drawing Sheets

APPARATUS FOR THE INTEGRAL MOULDING OF A SYNTHETIC PLASTICS PART

The invention relates to an apparatus for the injection moulding of a synthetic plastics part on a portion of flexible strip-like material with a total injection unit with nozzle, driven extruder worm, plasticising cylinder and with a synthetic plastics injection means, the nozzle being connected to the plasticising cylinder and being at least partially surrounded from the outside by two movable outer mold parts while the inner mold part is constituted by a movable mandrel.

It is known to produce liquid packages from paper coated on both sides with synthetic plastics material, the bottom being formed by folding over the walls of the tube, while the top is molded on and consists of thermoplastics material with no paper. The flexible paper material is in strip form and is so fed to a synthetic plastics integral molding apparatus that in a certain working rhythm the paper tube is disposed on a movable mandrel which serves as an inner mold part, outer mold parts are moved around it and are so pressed against each other that an injection molding cavity is formed alongside which ends the outlet from the nozzle, so that the extruder worm which is adapted for movement in the plasticising cylinder can be moved longitudinally in order to inject the synthetic plastics material into the injection molding cavity.

Since there are a plurality of thermoplastics injection molding systems available on the market, production of the synthetic plastics top on the liquids packages has been a matter of using conventional injection molding systems because it was then unnecessary to carry out development work and so entail the corresponding expense. To produce the pressures required for injection molding, the prior art thermoplastics injection molding systems were almost exclusively provided with hydraulic drives. For example, the prior art integral injection molding apparatus for instance comprises a first cylinder with which the extruder worm with all the parts located on it is moved towards the injection moulding tool, a second cylinder with which the worm is shot in the direction of the nozzle in order to inject the synthetic plastics material, and also a powerful hydraulic motor was provided to rotate the extruder worm so that the granular material could, in a properly measured quantity, be incorporated into the space in the plasticising cylinder under the tip of the extruder worm.

While the prior art thermoplastics injection molding systems indeed offered considerable flexibility by reason of these constructions, so that the most varied injection moldings could be produced under all manner of conditions, there is however the disadvantage that the prior art equipment is very expensive because it is quite complicated.

In addition, there is a quite substantial drawback in the field of foodstuffs which is that a leakage from the hydraulic system is as a rule virtually inevitable. However, very exacting demands are imposed on hygiene with regard to fluids which have to be processed in the foodstuffs sector, and for example oil may not under any circumstances be allowed to come into contact with contents. Only with expensive precautionary measures and corresponding technical precautions has it been possible to observe the legal requirements in this respect.

Therefore, the invention is based on the problem of so improving a synthetic plastics integral molding apparatus of the type which is described in greater detail that the technical complication can be reduced while at the same time the demands imposed in terms of hygiene can be better satisfied by such machines which pack liquids in the foodstuffs sector.

According to the invention, this problem is resolved in that the plasticising cylinder and the nozzle are stationary on the machine frame and in that the extruder worm is driven by an electric motor and in that the synthetic plastics injection unit comprises a driven two-armed lever which is subject to the action of a control force unit and which is in contact with the extruder worm which is adapted for movement in the direction of its longitudinal axis. The prior art thermoplastics injection molding systems are substantially more complicated in construction than the apparatus according to the invention, already by reason of the fact that the plasticising cylinder can be moved in a specific manner in relation to the machine frame. According to the invention, on the other hand, fitment of the plasticising cylinder together with the nozzle so that it is stationary on the machine frame substantially simplifies the injection molding apparatus. Hydraulic drives become unnecessary and so oil leakage problems are avoided in foodstuffs packaging machinery. The simplification of such an injection molding machine can be particularly noted when the synthetic plastics part which is to be integrally molded onto the portion of flexible material is required to undergo no variation of form in operation extending over large quantities, so that in other words the lid of a liquids package must always remain the same product which it is intended to inject by means of the apparatus according to the invention.

It is particularly expedient if the end of the extruder worm which is remote from the nozzle is keyed to a gear wheel which meshes with the driving pinion of an electric motor mounted on the machine frame and if the diameter of the gear wheel is greater than that of the driving pinion. This is a further measure towards simplifying the prior art systems whereby, in order to dispense measured quantities of the granulate which has later to be injection molded, after it has been plasticised, is carried out by an electric motor and a gearing system instead of being performed by means of a hydraulic cylinder. The more hydraulic cylinders are left off a foodstuffs packaging machine, the better one is able to satisfy the demands of hygiene. By virtue of the small diameter of the driving pinion on the electric motor and the large diameter of the gear wheel on the extruder worm, a multiplication of forces is possible which in the present case, as practice has shown, is sufficient for an electric motor to be able to apply the force needed to dispense the measured quantities of granulate and rotate the extruder worm.

If in the case of a further advantageous development of the invention the driving pinion of the electric motor is in the direction of its axis longer than the gear wheel on the extruder worm, then the extruder worm can be moved in the direction of its longitudinal axis, and nevertheless the gear wheel remains in frictional engagement with the pinion of the electric motor. During dispensed delivery of granular material into the space inside the plasticising cylinder and in front of the tip of the extruder worm, it is possible in fact for a certain movement to occur in the longitudinal direction of the extruder worm, even if one only bears in mind the fact that the granular material filled into the space has to be packed as tightly as possible and during the plasticising process may possibly even be reduced in volume. As with conventional thermoplastics injection molding systems, a hydraulic cylinder compensates for such a movement. Any doubts which may be entertained by a man skilled in the art to the effect that such compensation is impossible when using an electric drive are overcome by the aforementioned measures.

According to the invention, it is furthermore advantageous for the first arm of the two-armed lever of the synthetic plastics injection unit to be many times, preferably ten times, longer than the second arm of the two-armed lever, and for the second arm to be capable of being brought into pressure engagement with the gear wheel end of the extruder worm and for the longitudinal axis of the extruder worm to be disposed at right-angles to the axis of rotation of the two-armed lever. The man skilled in the art knows that after the plasticising cylinder has been filled with granular material, the hydraulic motor - and after the overall unit has been advanced by hydraulic cylinders - a further hydraulic cylinder must ensure that, for injection molding, the extruder worm is shot forwards in its longitudinal direction with its point facing the nozzle. If, therefore, the dispensing of the measured quantity is not carried out by an hydraulic motor but is according to the invention performed by an electric motor and if furthermore the total injection unit is attached to the nozzle in order to avoid having a further hydraulic cylinder on the machine frame, then the man skilled in the art nevertheless believes that at least the injection molding movement for the molten synthetic plastics material must be performed by the action of a high level force being exerted on the extruder worm by hydraulic cylinders. This prior art way of thinking has been overcome by the inventor who has proposed means whereby the injection molding forces can be provided by the aforesaid synthetic plastics injection unit without a hydraulic drive. The solutionis in fact provided by the aforesaid two-armed lever, of which the first arm is for example ten times longer than the second arm, which acts on the gear wheel end, in this case the so-called "rear" end. The axis of rotation of the two-armed lever which separates the first arm from the second arm is at a right-angle to the longitudinal axis of the extruder worm. In this way, when the first long arm is actuated, the force is correspondingly multiplied and is so applied to the second short arm that this suddenly rapidly and with considerable force shoots the extruder worm in the direction of its longitudinal axis, with its point at the front - in this example referred to as "downwards". The conditions for perfect functioning of an integral injection moulding apparatus of the type mentioned here can therefore be provided without a hydraulic cylinder. Only the opening and closing of the nozzle itself can be carried out by a small hydraulic drive which has a very low oil consumption so that leakages are of no import and the exacting demands in terms of hygiene can be fulfilled even in the case of foodstuffs packaging machines.

So, that no hydraulic cylinder has to be used for shooting in the extruder worm, an advantageous further development of the invention provides for the control force unit of the synthetic plastics injecting means to comprise a pressing fluid cylinder provided at the free end of the first arm of the two-armed lever and has a piston the piston rod of which is braced against the machine frame. The fluid provided is preferably air so that the control force unit operates with a pressing air cylinder so that the man skilled in the art can use pneumatic techniques with which he is familiar and by means of which a clean, perfect and readily controllable movement or even a drive facility are provided. The first arm of the two-armed lever is longer than the second arm. Therefore, the force must engage the first arm in order to be able, via the second short arm, to apply the multiplied force to the extruder worm. Therefore, the pressing fluid cylinder engages the free end of the first arm. The other opposite end of this first arm lies at the axis of rotation of the two-armed lever. By injection fluid, preferably air, the piston attached to the first arm can therefore be moved in relation to the machine frame, preferably away from it, so that in consequence the second short arm is constrained to move towards the machine frame so producing the desired shooting-in movement.

The control force unit is further developed, and this provides further advantages for the invention, in that the pressing fluid cylinder comprises a first fluid inlet remote from the first arm of the two-armed lever and a second fluid inlet which faces the first arm and in that the first or second fluid inlet is connected to a pressing fluid tank in which the fluid pressure is substantially constant, while the second or first fluid inlet is connected to a fluid pressure control device. Such control devices may be valves. With these valves, in the case of a pneumatic control force unit, if the fluid is therefore air, it is possible to exercise control via the second air inlet, the control allowing the free end of the first long arm of the two-armed lever to move in one direction or the other about its axis of rotation resulting in a correspondingly reversed direction of the second short lever. Thus, a corresponding force is applied to the extruder worm in the desired direction of movement.

In comparison with the prior art hydraulic devices, hydraulics are according to the invention largely avoided so that a cheaper and more simply constructed thermoplastics injection molding system can be obtained. At the production stage, considerable energy is advantageously saved, because substantially less hydraulic fluid is moved, and the new construction also does away with a vast number of those movements which were planned for the conventional systems and which are as a rule used. Furthermore, the prior art poor efficiency of the hydraulic system is avoided because according to the invention drives are used which operate substantially more effectively than hydraulic systems.

Figure 2:
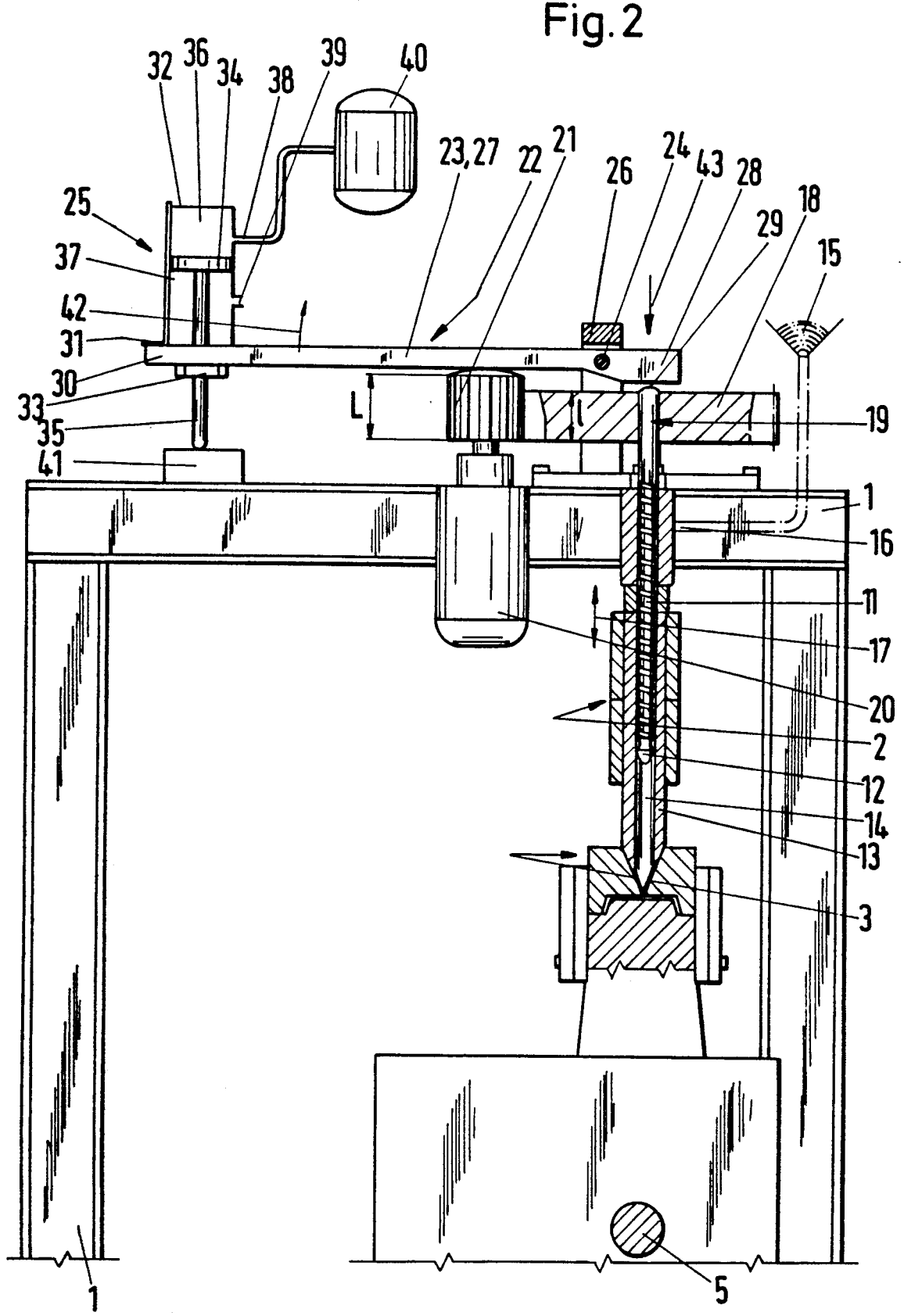

Further advantages, features and possible applications of the present invention will emerge from the ensuing description of a preferred example of embodiment in conjunction with the drawings in which:

FIG. 1 is a side view of the injection molding apparatus with mandrel wheel, outer mould parts, nozzle and overall injection unit and FIG. 2 shows another side view looking from left to right for example in FIG. 1.

Mounted on the machine frame 1, in the upper portion thereof, is the overall injection molding unit designated 2 with the nozzle 4 mounted on that end thereof which is towards the tool generally designated 3. As a result of the rigid mounting of the overall injection molding unit 2 on the machine frame 1, the nozzle is at a fixed distance above the shaft 5 of a mandrel wheel 6, the mandrels 7 of which project radially and are so shifted intermittently that in each case one mandrel 7 serves as an inner mould part and is in the position under the nozzle 4 as shown in FIG. 1 so that the longitudinal axis 7' of this mandrel 7 is aligned with the longitudinal axis 2' of the overall injection molding unit 2. The actual mold chamber for the top of a liquids package which is to be injected from synthetic plastics material is formed at the top of the mandrel 7 by the mandrel 7 serving as an inner mold part and the two outer mold parts 8, 8'. These are adapted to pivot about axes 9, 9' (FIG. 1) by means of drive levers (10, 10') into a closed or opened position. FIG. 1 shows the open position in dash-dotted lines and the closed position is shown by solid lines. It can be seen that the two movable outer mold parts 8, 8', the nozzle 4 and the inner mold part 7 at least partially engage around and are shaped like the mandrel.

During the injection molding process, the shooting of the extruder worm 11 falls in the direction of its longitudinal axis 2' with its point 12 in front, in other words downwardly in the direction of the nozzle 4 causes synthetic plastics material to be injected from the nozzle into the mould cavity. Upon conclusion of the injection molding process and preliminary cooling, the outer mold parts 8, 8' are pivoted into the open position shown by broken lines in FIG. 1 and the mandrel wheel 6 is moved on through 90° so that the inner mold part 7, in the form of the movable mandrel, is moved out of the space under the nozzle 4. During this movement, a further mandrel is rotated into the position under the nozzle 4 to serve as the next inner mould part, so that the same process is repeated.

For the present part of the injection molding apparatus, attention is now drawn to the overall injection molding unit 2, the plasticising cylinder 13 of which so encloses the worm 11 that a filling space 14 is formed between the nozzle 4 and the tip 12 of the extruder worm 11 and can be filled with a measured quantity of granular material.

For filling this space 14, the extruder worm 11 must be rotatable so that the diagrammatically shown granular material 15 is fed in at the filling point 16 and can be moved forwardly and downwardly by the worm into the filling space 14. Furthermore, the extruder worm 11 must be capable of upwards and downwards movement in the direction of its longitudinal axis 2' as indicated by the double-headed arrow 17, inter alia also for shooting-in the synthetic plastics material after it has been plasticised in the space 14, as will be described hereinafter.

At the front bottom end the extruder worm 11 has a point 12 while at the upper rear end, in other words the end opposite the point 12, a gear wheel 18 is keyed on by a spline and key joint. Reference numeral 19 denotes that end of the extruder worm 11 which is remote from the nozzle 4 and on which the gear wheel 18 is mounted.

Also mounted on the machine frame 1 is an electric motor 20, the drive pinion 21 of which meshes with the gear wheel 18 of the extruder worm 11. The axes of rotation of the electric motor 20 with the drive pinion 21 on the one hand and of the gear wheel 18 on the other are parallel with each other and are naturally also parallel with the longitudinal axis 2' of the extruder worm 11.

FIG. 2 shows that the length L of the drive pinion 21 is greater than the length l of the gear wheel 18. The difference between the two lengths L and l is substantially equal to the stroke which can be performed by the extruder worm 11 in the direction of the double-headed arrow 17.

In connection with this stroke, it would be expedient to describe a synthetic plastics injection means 22. Essentially, this consists of a two-armed lever 21 which is rotatable about an axis 24, and a control force unit 25, both of which are now described in greater detail with reference to FIG. 2.

The axis of rotation 24 of the two-armed lever 23 is disposed on a support 26 mounted on the machine frame 1. The first arm 27 of the two-armed lever 23 is many times longer than the second short arm 28, of which the surface 29 which is towards the extruder worm 11 and in particular in this case towards its gear wheel end 19 can be brought into operative engagement with the upper surface of the gear wheel end 19 of the extruder worm 11. For example, if the first arm 27 is stopped in the horizontal position shown in FIG. 2, then the extruder worm 11 can only move upwardly towards the second arm and in the direction of the double-headed arrow 17 until it abuts the surface 29 on the second arm 28.

Mounted at the free ends 30 of the first arm 27 via a support 31 is a pneumatic cylinder 32, the mounting being shown between the free end 30 of the long arm 27 and the pneumatic cylinder 32, also at 33. In the cylinder 32 a piston 34 with a piston rod 35 is adapted for movement and the whole unit 31 to 35 is referred to as the control force unit 25.

In the present case, the pressing fluid cylinder 32 must be regarded as a pneumatic or air cylinder and provides an upper pressure space 36 on one upper side of the piston 34 and a lower pressure space 37 on the opposite side of the piston 34. The outer upper pressure space 36 is provided with a fluid inlet 38 remote from the first arm 27 while the second pressure space 37 on the other side of the pressing air cylinder 32, in relation to the piston 34, is provided with a second fluid inlet 39 which faces the first arm 27 of the two-armed lever 23.

The first fluid inlet 38 is connected to a pressing fluid tank 40 in which an appropriate fluid pressure device maintains a substantially constant fluid pressure of for example 5 to 6 bars. In the example of the pneumatic control arrangement chosen here, there is a constant air pressure of 5 to 6 bars maintained in the pressing air tank 40.

The second fluid inlet 39 is so connected to a fluid pressure control device, not shown, for example by means of a pump and valves, that in this case either the same pressure of for example 5 or 6 bars can be built up, possibly increased and also relieved. It will be appreciated that when relieving the second fluid inlet 39, the air pressure of for example 5 bars in the upper outer pressure space 36 produces a drawing up of the pressing air cylinder 32 in relation to the support 41 on the machine frame 1, so that the first arm 27 is pivoted in a clockwise direction as indicated by the curved arrow 42 about the axis of rotation 24 with the result that the second right-hand short arm 28 of the two-armed lever 23 is likewise rotated in a clockwise direction, its engaging surface 29 pressing the extruder worm 11 downwards, for example in order to inject synthetic plastics material.

In operation, the injection molding apparatus described here in initially supplied with granular material 15 through the inlet 16, the electric motor 20, via the drive pinion 21 and the gear wheel 18, rotating the extruder worm 11 until such time as the filling space 14 is filled with granular material.

The upwards pressure created on the extruder worm 11 in the direction of the double-headed arrow 17 as granular material drops in measured quantities into the filling space 14 causes the gear wheel ends 19 of the extruder worm 11 to abut the oppositely disposed surface 29 of the short right-hand second arm 28 of the two-armed lever 23. So that the extruder worm 11 does not give way upwardly, a counter-pressure, as indicated by the arrow 43, must be generated in the direction of the longitudinal axis 2' of the extruder worm 2 to press it downwards onto the nozzle 4. This counter-pressure 43 compensates for the pressure created during filling with granular material 15.

The counter-pressure 43 is generated in that the first arm 27 of the two-armed lever 23 is maintained in a preset position. For example, the given fluid pressure in the upper pressure space 36 establishes the position of the piston 34 in respect of the support 41 on the machine frame 1. It will be appreciated that in this case the second fluid inlet 39 has to have the same pressure applied to its as in the pressing air tank 40 so that the piston 34 does not move in the pressing air cylinder 32.

When the granular material 15 has become fused in the filling space 14 by being heated and is to be injected into the mold cavity, then the second fluid inlet 39 is vented by being opened, the piston 34 moves downwards in the pressing air cylinder 32 so that the pressing air cylinder 32 together with the support 31 and the free end 30 of the first arm 27 is pulled upwards clockwise in the direction of the arrow 42. This movement occurs abruptly when the second fluid inlet 39 is abruptly relieved. Equally abruptly, the surface 29 of the second arm 28 moves downwardly towards the gear wheel end 19 of the extruder worm 11 and presses the tip 12 downwardly onto the nozzle 4. Thus the injection molding process in which high injection molding forces are applied, is concluded.

I claim:

1. An apparatus for the integral molding of a synthetic plastics part on a portion of flexible strip-like material with a total injection molding unit with a nozzle, a driven extruder worm, plasticising cylinder and with a synthetic plastics injection unit, the nozzle being connected to the plasticising cylinder and being surrounded at least partially on the outside by two movable outer mold parts, an inner mold part consisting of a movable mandrel, wherein the plasticising cylinder and the nozzle are stationary on the machine frame and in that the extruder worm is driven by an electric motor and the synthetic plastics injection unit comprises a driven two-armed lever which is subject to the action of a control force unit and which is in contact with the extruder worm which is adapted for movement in the direction of its longitudinal axis.

2. An apparatus according to claim 1, wherein the end of the extruder worm which is remote from the nozzle is keyed on a gear wheel which meshes with a driving pinion of an electric motor mounted on the machine frame and in that the diameter of the gear wheel is greater than that of the driving pinion.

3. An apparatus according to claim 2, wherein the driving pinion of the electric motor is longer in the direction of its axis than the gear wheel on the extruder worm.

4. An apparatus according to claim 1, wherein the first arm of the two-armed lever of the synthetic plastics injection unit is many times longer than the second arm of the two-armed lever and in that the second arm is adapted to be brought into pressure engagement with the gear wheel end of the extruder worm and in that the longitudinal axis of the extruder worm is disposed at a right-angle to the axis of rotation of the two-armed lever.

5. An apparatus according to claim 1, wherein the control force unit of the synthetic plastics injection unit comprises a pressing fluid cylinder disposed at the free end of the first arm of the two-armed lever and has a piston the piston rod of which is braced against the machine frame.

6. An apparatus according to one of claim 1 wherein the pressing fluid cylinder comprises a first fluid inlet remote from the first arm of the two-armed lever and a second fluid inlet which is facing the first arm and in that the first or second fluid inlet is connected to a pressing fluid tank of substantially constant fluid pressure (5-6 bars), while the second or first fluid inlet is connected to a fluid pressure control device.

* * * * *